(12) United States Patent
Nam

(10) Patent No.: US 8,769,931 B2
(45) Date of Patent: Jul. 8, 2014

(54) LOW PRESSURE EGR SYSTEM AND EXAMINING METHOD FOR EFFICIENCY OF LOW EGR COOLER

(75) Inventor: Kihoon Nam, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 251 days.

(21) Appl. No.: 13/315,073

(22) Filed: Dec. 8, 2011

(65) Prior Publication Data

US 2012/0312001 A1     Dec. 13, 2012

(30) Foreign Application Priority Data

Jun. 13, 2011   (KR) .......................... 10-2011-0057019

(51) Int. Cl.
*F02M 25/06* (2006.01)

(52) U.S. Cl.
USPC .................... 60/278; 60/277; 60/299; 60/311

(58) Field of Classification Search
USPC .................................................. 60/274–324
See application file for complete search history.

(56) References Cited

U.S. PATENT DOCUMENTS

| | | | |
|---|---|---|---|
| 6,848,434 B2 * | 2/2005 | Li et al. ..................... | 123/568.12 |
| 6,993,909 B2 * | 2/2006 | Matsunaga et al. .......... | 60/605.2 |
| 7,921,639 B2 * | 4/2011 | Silbermann et al. ............ | 60/278 |
| 2008/0295514 A1 * | 12/2008 | Ono ............................... | 60/602 |
| 2009/0277431 A1 * | 11/2009 | Nitzke et al. ............. | 123/568.12 |
| 2010/0051001 A1 * | 3/2010 | Webb et al. .............. | 123/568.12 |
| 2012/0266594 A1 * | 10/2012 | Christmann ................ | 60/605.2 |

\* cited by examiner

*Primary Examiner* — Jesse Bogue

(74) *Attorney, Agent, or Firm* — Morgan, Lewis & Bockius LLP

(57) ABSTRACT

A low pressure exhaust gas recirculation (EGR) cooler efficiency diagnosis method for an EGR system includes measuring speed and load of an engine, setting a difference threshold between model temperature and detected temperature downstream of the low pressure EGR cooler according to speed and load of the engine, measuring a pressure difference between upstream and downstream sides of the EGR valve, calculating a mass flow rate of an exhaust gas passing through the low pressure EGR cooler based on the measured pressure difference, calculating the efficiency of the low pressure EGR cooler based on the calculated mass flow rate, calculating the model temperature downstream of the low pressure EGR cooler based on the calculated efficiency, and comparing the model temperature downstream of the low pressure EGR cooler with the detected temperature downstream of the low pressure EGR cooler. A low pressure EGR system is also disclosed.

13 Claims, 2 Drawing Sheets

LOW PRESSURE EGR SYSTEM AND EXAMINING METHOD FOR EFFICIENCY OF LOW EGR COOLER

CROSS-REFERENCE TO RELATED APPLICATION

The present application claims priority of Korean Patent Application Number 10-2011-0057019 filed in the Korean Intellectual Property Office on Jun. 13, 2011, the entire contents of which application is incorporated herein for all purposes by this reference.

BACKGROUND OF INVENTION

1. Field of Invention

The present invention relates to a method for diagnosing efficiency of a low pressure exhaust gas recirculation (EGR) system and a low pressure EGR cooler. More particularly, the present invention relates to a temperature calculation method for a low pressure EGR cooler of a low pressure EGR system and a low pressure EGR cooler efficiency diagnosis method, which uses a low pressure EGR valve model and a low pressure EGR cooler model.

2. Description of Related Art

Generally, most diesel engines are provided with an exhaust gas recirculation (EGR) system so as to satisfy exhaust gas regulations.

The exhaust gas recirculation system recirculates a part of the exhaust gas exhausted from the engine to an intake line to reduce the combustion temperature of the engine and to reduce the NOx generation amount.

NOx elimination has become an important factor pursuant to the exhaust gas regulations of the EU and North America, and a low pressure EGR system as well as a high pressure EGR system are used so as to efficiently control the temperature and the flow rate of the recirculated exhaust gas.

Particularly, an EGR cooler has been recently applied to meet the exhaust gas regulations for the diesel engines. However, since the EGR cooler cools the exhaust gas, smoke or particulate matters (PM) may block the inner passage of the EGR cooler. In this case, the efficiency of the EGR cooler is deteriorated.

When the efficiency of the EGR cooler is deteriorated, the exhaust gas is not normally cooled and it is hard to know whether the EGR cooler is blocked or not by appearance, and therefore it is necessary to develop a model or method to predict the efficiency of the cooler. More particularly, it is necessary to check the efficiency of the EGR cooler without disassembling the EGR cooler.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide a method having advantages of diagnosing efficiency of a low pressure exhaust gas recirculation (EGR) cooler by using a low pressure EGR valve model and a low pressure EGR cooler model in a low pressure EGR system.

Other aspects of the present invention are directed to provide a system having advantages of diagnosing efficiency of the low pressure EGR cooler by calculating a model temperature at a downstream side of a low pressure EGR cooler.

Exemplary low pressure EGR cooler efficiency diagnosis methods of the present invention for an EGR system may include measuring a speed and a load of an engine, setting a threshold of a difference between a model temperature and a detected temperature downstream of the low pressure EGR cooler according to the speed and the load of the engine, measuring a pressure difference between an upstream side and a downstream side of the EGR valve, calculating a mass flow rate of an exhaust gas passing through the low pressure EGR cooler based on the measured pressure difference, calculating the efficiency of the low pressure EGR cooler based on the calculated mass flow rate, calculating the model temperature downstream of the low pressure EGR cooler based on the calculated efficiency, and comparing the model temperature downstream of the low pressure EGR cooler with the detected temperature downstream of the low pressure EGR cooler.

The mass flow rate of exhaust gas passing through the low pressure EGR cooler may be calculated through the low pressure EGR valve model.

The efficiency of the low pressure EGR cooler may be calculated by the mass flow rate of exhaust gas passing through the low pressure EGR cooler, the coolant temperature, and the exhaust gas temperature of the inlet of the low pressure EGR cooler.

The temperature downstream of the low pressure EGR cooler may be calculated by the low pressure EGR cooler efficiency model. If the difference between the model temperature and the detected temperature is larger than a predetermined threshold, a debounce time is continued. The low pressure EGR system may be stopped if errors are continuously generated while the debounce is being performed.

The low pressure EGR cooler efficiency diagnosis method may further include sending an alarm through a warning lamp when the low pressure EGR system is stopped.

Exemplary low pressure EGR systems, which include an intake line through which intake air is supplied into an engine, an exhaust line through which exhaust gas of the engine passes, a low pressure EGR line that is diverged from the exhaust line and connected to the intake line, a low pressure EGR valve that is disposed on the low pressure EGR line, and a low pressure EGR cooler that cools the exhaust gas flowing through the low pressure EGR valve, may include pressure sensors disposed at a downstream side and an upstream side of the low pressure EGR valve, a temperature sensor disposed at a downstream side of the low pressure EGR cooler, and a control portion that uses a pressure difference measured by the pressure sensors to calculate a mass flow rate of exhaust gas passing through the low pressure EGR line and uses the mass flow rate to calculate the temperature of the downstream side of the low pressure EGR cooler.

The pressure sensors may be disposed at an upstream side and a downstream side of the low pressure EGR valve and/or at an upstream side and a downstream side of the low pressure EGR cooler.

An emergency filter may be disposed at an upstream side of the low pressure EGR cooler. A catalyst may be disposed at an upstream side of the low pressure EGR line. The catalyst may include a diesel filter catalyst and a diesel oxidation catalyst. A warning lamp may be disposed to send an alarm of an emergency condition of the system for the low pressure EGR.

Exemplary diagnosis methods of the present invention may use the flow rate model in the low pressure EGR valve and the efficiency model in the low pressure EGR cooler to diagnosis the efficiency of the low pressure EGR cooler.

The amount of the exhaust gas passing through the low pressure EGR cooler and the temperature of the exhaust gas flowing into the inlet of the low pressure EGR cooler are used to calculate the temperature at the downstream side of the low pressure EGR cooler.

Also, the model temperature at the downstream side of the low pressure EGR cooler is compared with the measured temperature thereof to diagnose the efficiency of the low pressure EGR cooler.

Further, the present invention can meet regulations such as Euro-6 by predicting efficiency of the low pressure EGR cooler.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
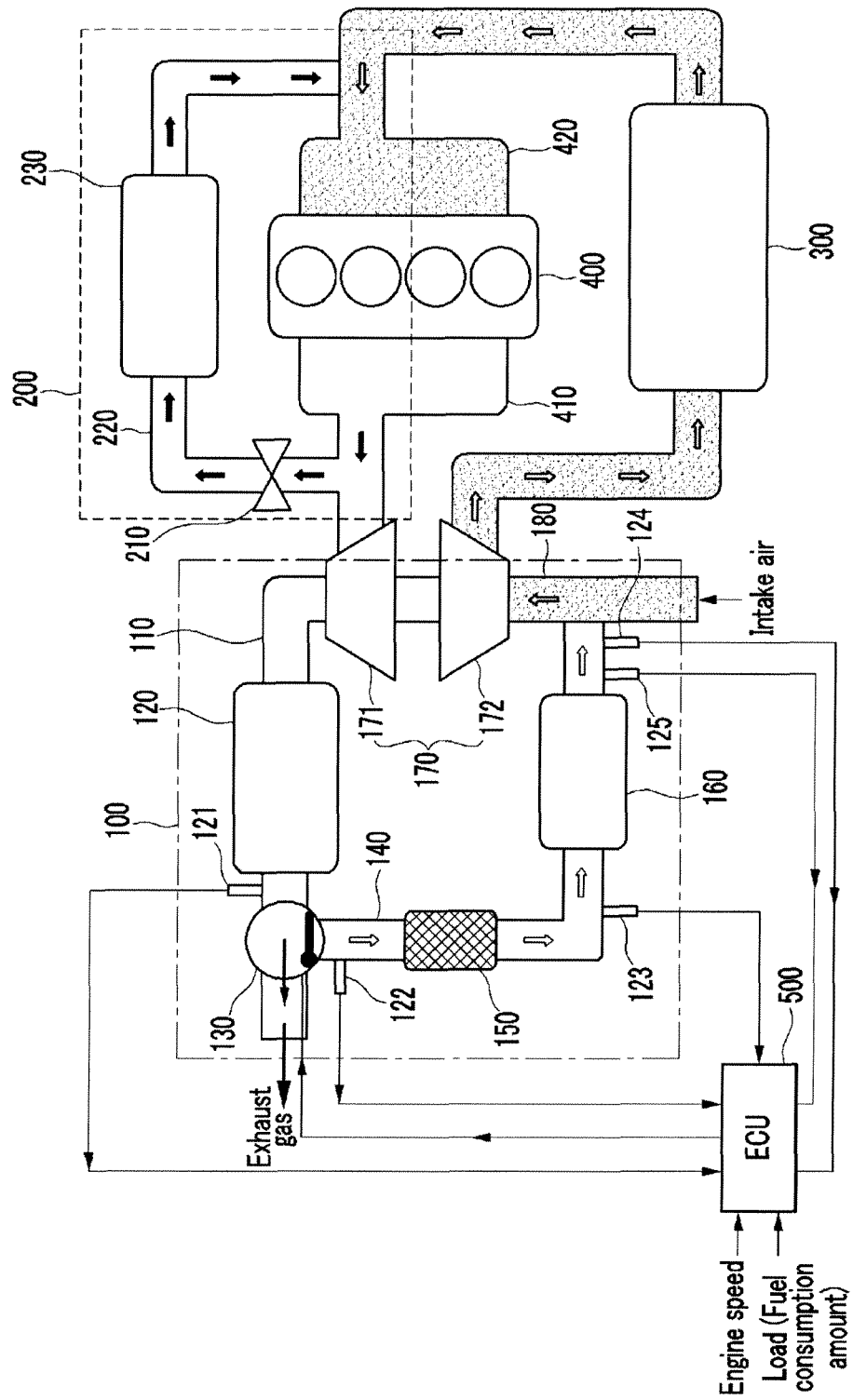
FIG. 1 is a schematic diagram of an exemplary exhaust gas recirculation (EGR) system according to various aspects of the present invention.

Generally, in a system as shown in FIG. 1, in which exhaust gas is recirculated from an exhaust line 110 to an intake line 180, a high pressure EGR system 200 is diverged from an upstream side of a turbine 171 of a turbocharger 170 and a low pressure EGR system 100 is diverged from a downstream side of a purification device such as a diesel particulate filter (DPF).

Referring again to FIG. 1, the low pressure EGR system 100 according to various embodiments of the present invention includes an intake line 180 that supplies the engine with fresh air, a low pressure EGR line 140 that is diverged from the exhaust line 110 through which the exhaust gas flows from an engine 400 to be connected to the intake line 180 such that the exhaust gas is recirculated through this, a low pressure EGR valve 130 that is disposed on the low pressure EGR line 140 to adjust the exhaust gas recirculation amount, pressure sensors 121, 122, 123, 124 that are disposed at a downstream side and an upstream side of the low pressure EGR valve 130 to measure the pressure difference between the upstream side and the downstream side of the low pressure EGR valve 130, a temperature sensor 125 that is disposed at a downstream side of the low pressure EGR cooler 160, a low pressure EGR cooler 160 that is disposed on the low pressure EGR line 140 to cool the exhaust gas being recirculated, and a control portion 500 that uses the pressure difference between the downstream side and the upstream side of the low pressure EGR valve 130 and the flowing amount passing the low pressure EGR line 140 to calculate a model temperature of a downstream side of the low pressure EGR cooler 160, and compares the calculated model temperature with the measured temperature of the downstream side of the low pressure EGR cooler 160 to be able to diagnose the efficiency of the low pressure EGR cooler 160.

Also, the low pressure EGR valve 130 is disposed at a portion diverged from the exhaust line 110, which can be a 3-way valve to make the exhaust gas of the exhaust line 110 flow into the low pressure EGR line 140 in various embodiments of the present invention.

In this case, a catalyst 120 is disposed in the exhaust line 110, the catalyst 120 can include a diesel filter catalyst (DPF) or a diesel oxidation catalyst (DOC), and the low pressure EGR valve 130 is disposed at a downstream side of the catalyst 120. The DPF is disposed at an upstream side of the exhaust line 110 connected to an engine exhaust manifold 410 to filter particulate matters (PM), and the DOC is disposed at a downstream side of the DPF and oxidizes hydrocarbon and carbon monoxide of exhaust gas as well as a soluble organic fraction (SOF) of particulate matters to transform them into carbon dioxide and water.

Further, the low pressure EGR cooler 160 that cools the exhaust gas flowing through the low pressure EGR valve 130 is disposed at a downstream side of the low pressure EGR valve 130 in various embodiments of the present invention, and an emergency filter 150 is disposed at a downstream side of the low pressure EGR valve 130 so as to filter foreign materials included in the low pressure EGR gas.

Here, the high pressure EGR system 200 supplies a high pressure EGR line 220 with exhaust gas of the exhaust line that is connected to the exhaust manifold 410 of the engine 400 through a high pressure EGR valve 210, and the high temperature and high pressure exhaust gas passes a high pressure EGR cooler 230 to be cooled and join the intake air to be supplied to the engine 400 through an intake manifold 420.

Here, the turbocharger 170 is disposed at the exhaust line 110 and the intake line 180, wherein the turbocharger 170 includes the turbine 171 that uses a hot/high pressure exhaust gas flowing the exhaust line 110 to generate rotation energy and a compressor 172 that is connected to the turbine 171 to compress the intake air of the intake line that is connected to the engine 400 so as to supply the intake air to the engine 400.

The mixture of the recirculated exhaust gas and the intake air flowing in the intake line 180 passes an intercooler 300 to be cooled and is supplied to the engine 400 through the intake manifold 420.

Also, the pressure sensor 121 is disposed at an upstream side and the pressure sensors 122, 123, and 124 are disposed at a downstream side of the low pressure EGR valve, the downstream side pressure sensors include an immediate downstream side pressure sensor 122 of the low pressure EGR valve 130 and an upstream side pressure sensor 123 of the low pressure EGR cooler 160 and/or a downstream side pressure sensor 124 of the low pressure EGR cooler 160 in various embodiments of the present invention. However, the positions of the pressure sensors, which are used to measure or calculate the flow rate of exhaust gas passing through the low pressure EGR cooler 160 by the pressure difference between the downstream and the upstream of the low pressure EGR cooler 160, can be varied.

The first pressure sensor 121 is disposed between the catalyst 120 and the low pressure EGR valve 130, and the second pressure sensors 122, 123, and 124 are disposed at one of the immediate downstream side of the low pressure EGR valve 130, the upstream side and the downstream side of the low pressure EGR cooler 160 in FIG. 1. In other words, the first pressure sensor 121 and one of the second pressure sensors 122, 123, and 124 are used to calculate the pressure difference between the downstream and the upstream of the low pressure EGR valve 130.

The pressure difference measured by the pressure sensors 121, 122, 123, 124 that are disposed at a upstream side and a downstream side of the low pressure EGR cooler 160 and the mass flow rate of exhaust gas passing through the low pressure EGR cooler 160 are used to calculate the temperature of the downstream side of the low pressure EGR cooler 160 in various embodiments of the present invention.

Further, the model temperature of the downstream side of the low pressure EGR cooler 160 is compared with the measured temperature thereof to diagnose the efficiency of the pressure EGR cooler 160 so as to prevent deterioration of the cooling efficiency of the exhaust gas.

More particularly, the efficiency of the low pressure EGR cooler 160 can be diagnosed according to various embodiments of the present invention, wherein the pressure difference between the downstream and the upstream of the low pressure EGR valve 130 is measured by the pressure sensors, the measured pressure difference is used to calculate the mass flow rate of exhaust gas passing through the low pressure EGR cooler 160, and the calculated mass flow rate is used to calculate the model temperature of the downstream side of the low pressure EGR cooler 160.

Hereinafter, referring to FIG. 2, a method for diagnosing the efficiency of the low pressure EGR cooler 160 will be described.

Figure 2:
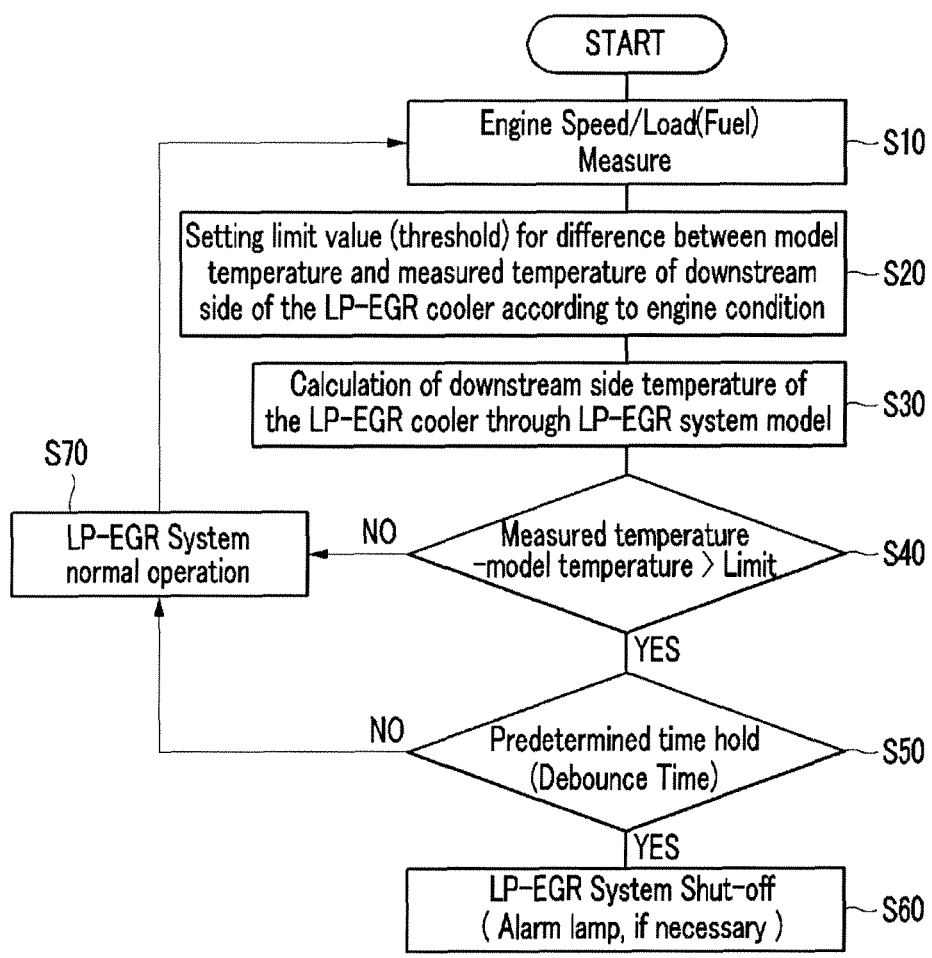
FIG. 2 is a flowchart for calculating a model temperature at the downstream side of a low pressure EGR cooler according to various aspects of the present invention.

As shown in FIG. 2, the speed and the load of the engine are measured so as to calculate the model temperature of the downstream side of the low pressure EGR cooler 160 in S10.

A threshold value of a difference between the model temperature and the measured temperature of the downstream side of the low pressure EGR cooler 160 is set according to the measured engine speed and the load in S20, and the temperature of the downstream side of the low pressure EGR cooler 160 is calculated through the model of the low pressure EGR system 100 in S30.

The calculated model temperature of the downstream side of the low pressure EGR cooler 160 is compared with the measured temperature of the downstream side of the low pressure EGR cooler 160, and it is determined whether the difference between the model temperature and the measured temperature is larger than the threshold value in S40. If the difference between the model temperature and the measured temperature is less than the threshold value, it is determined that the low pressure EGR system 100 is being normally operated in S70. However, if the difference between the model temperature and the measured temperature is larger than the predetermined threshold value, this condition is allowed to be continued for a predetermined time in S50. This is because the system can temporarily malfunction as a result of noise and so on. This is called a debounce time.

As time goes on, when the errors are continuously detected by the difference value between the model temperature and the measured temperature, the emergency lamp is lit to give a warning and the low pressure EGR system 100 is stopped in S60.

Hereinafter, the method for calculating the model temperature of the downstream side of the low pressure EGR cooler 160 will be described.

The flow model in the low pressure EGR valve 130 may take a form of an ideal nozzle flow rate model assuming the exhaust gas is a perfect gas and the flow is isentropic. The flow rate can be calculated based on Bernoulli equation which is as follows.

$$P_1 + \frac{1}{2} \cdot \rho \cdot V_1^2 = P_2 + \frac{1}{2} \cdot \rho \cdot V_2^2 \qquad \text{Eq. (1)}$$

In Eq. (1), $P_1$ is the pressure of an upstream side of the low pressure EGR valve 130, $P_2$ is the pressure of a downstream side of the low pressure EGR line 140, $\rho$ is the density of the exhaust gas, $V_1$ is the flow speed of an upstream side of the low pressure EGR valve 130, and $V_2$ is the flow speed of a downstream side of the low pressure EGR valve 130.

However, because the actual nozzle flow is not an ideal flow, it has to be compensated, and for this purpose, an effective flow area is introduced to the model.

More particularly, the mass flow rate of exhaust gas passing through the low pressure EGR cooler 160 is calculated as follows according to a throttle equation.

$$\dot{m}_{LP\_EGR} = \rho_{exh} Q_{exh} = \qquad \text{Eq. (2)}$$
$$C \cdot A_{Flap} \sqrt{2\rho_{exh} \Delta P} = f(\Delta P, \text{valve position}) \sqrt{2\rho_{exh} \Delta P}$$

In Eq. (2), $\dot{m}_{LP\text{-}EGR}$ is a mass flow rate of the exhaust gas flowing in the low pressure EGR line 140, $\rho_{exh}$ is the density thereof, $Q_{exh}$ is the volume flow rate, C is a coefficient, $A_{Flap}$ is a cross-section of the low pressure EGR valve 130, $\Delta P$ is a pressure difference between the upstream and the downstream of the low pressure EGR valve 130, and valve position is an opening rate of the low pressure EGR valve 130.

As can be seen from Eq. (2), the pressure difference between the front and rear of the low pressure EGR valve 130 and the valve opening rate are used to calculate the mass flow rate of exhaust gas passing through the low pressure EGR line 140.

Also, the model temperature of the downstream side of the low pressure EGR cooler 160 is calculated from the equations of the mass flow rate of exhaust gas passing through the low pressure EGR cooler 160, the coolant temperature, and the temperature of the exhaust gas in the inlet of the low pressure EGR cooler 160 in the efficiency model of the low pressure EGR cooler 160, wherein it is assumed that there is no pressure deterioration through the low pressure EGR cooler 160 in the low pressure EGR cooler 160 model and that heat is transferred through convection.

Here, the efficiency equation of the low pressure EGR cooler 160 is as follows.

$$T_{out} = T_{in} - \eta(T_{in} - T_{coolant}) \qquad \text{Eq. (3)}$$

In Eq. (3), $T_{out}$ is a model temperature of a downstream side of the low pressure EGR cooler 160, $T_{in}$ is an exhaust gas temperature of an upstream side of the low pressure EGR cooler 160, $\eta$ is an efficiency of the low pressure EGR cooler 160, and $T_{coolant}$ is a coolant temperature flowing in or flowing out of the low pressure EGR cooler 160.

The efficiency equation of the low pressure EGR cooler 160 can be expressed as follows.

$$\eta = f(\dot{m}_{LP\text{-}EGR}, T_{coolant}, T_{in}) \qquad \text{Eq. (4)}$$

In Eq. (4), if the mass flow rate of exhaust gas passing through the low pressure EGR cooler 160, the coolant temperature of the low pressure EGR cooler 160, and the exhaust gas temperature of the inlet portion of the low pressure EGR cooler 160 are known therefrom, the efficiency of the low pressure EGR cooler 160 can be calculated.

The efficiency in Eq. (4) is substituted into Eq. (3) to calculate the model temperature of the downstream side of the low pressure EGR cooler 160.

The calculated model temperature of the downstream side of the low pressure EGR cooler 160 is compared with the measured temperature of the downstream side of the low pressure EGR cooler 160 to diagnose the efficiency of the low pressure EGR cooler 160.

Here, if the model temperature is larger than the measured temperature and the difference thereof is larger than the threshold value, it can be determined that the efficiency of the low pressure EGR cooler 160 is abnormal. If the difference between the model temperature and the measured temperature is smaller than the predetermined threshold, it can be known that the low pressure EGR system 100 is being normally operated. But if the difference is larger than the predetermined threshold and the error condition is continued for a debounce time, it can be known that the low pressure EGR system 100 operates abnormally. In this case, the control portion 500 causes the warning lamp to be lit to notify an operator of an emergency condition such that the operator can stop the system.

For convenience in explanation and accurate definition in the appended claims, the terms "upstream" or "downstream", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A low pressure exhaust gas recirculation (EGR) cooler efficiency diagnosis method for an EGR system, the method comprising:
   measuring a speed and a load of an engine;
   using an ECU to perform the following steps;
   setting a threshold of a difference between a model temperature and a detected temperature downstream of a low pressure EGR cooler according to the speed and the load of the engine;
   measuring a pressure difference between an upstream side and a downstream side of a low pressure EGR valve;
   calculating a mass flow rate of an exhaust gas passing through the low pressure EGR cooler based on the measured pressure difference;
   calculating an efficiency of the low pressure EGR cooler based on the calculated mass flow rate;
   calculating the model temperature downstream of the low pressure EGR cooler based on the calculated efficiency; and
   comparing the model temperature downstream of the low pressure EGR cooler with the detected temperature downstream of the low pressure EGR cooler, wherein the mass flow rate of the exhaust gas is calculated according to a first equation of $$\dot{m}_{LP\text{-}EGR} = \rho_{exh} Q_{exh} = C \cdot A_{Flap} \sqrt{2\rho_{exh}\Delta P} = f(\Delta P, \text{valve position})\sqrt{2\rho_{exh}\Delta P} \quad \text{Eq. (1)}$$

wherein, the $\dot{m}_{LP\text{-}EGR}$ is a mass flow rate of the exhaust gas flowing in a low pressure EGR line,
   wherein the $\rho_{exh}$ is a density of the exhaust gas,
   wherein the $Q_{exh}$ is a volume flow rate of the exhaust gas,
   wherein the C is a coefficient,
   wherein the $A_{Flap}$ is a cross-section of the low pressure EGR valve,
   wherein the $\Delta P$ is the pressure difference between the upstream and the downstream of the low pressure EGR valve,
   wherein the efficiency of the low pressure EGR cooler is calculated according to a second equation of $$\eta = f(\dot{m}_{LP\text{-}EGR}, T_{coolant}, T_{in}), \quad \text{Eq. (2)}$$

wherein the $T_{coolant}$ is a coolant temperature flowing in or flowing out of the low pressure EGR cooler, and
   wherein the $T_{in}$ is an exhaust gas temperature of an upstream side of the low pressure EGR cooler,
   and
   wherein the calculating of the model temperature downstream of the low pressure EGR cooler is performed by substituting the second equation into a third equation of $$T_{out} = T_{in} - \eta(T_{in} - T_{coolant}), \quad \text{Eq. (3)}$$

wherein the $T_{out}$ is the model temperature of a downstream side of the low pressure EGR cooler, and
   wherein the $\eta$ is the efficiency of the low pressure EGR cooler.

2. The low pressure EGR cooler efficiency diagnosis method of claim 1, wherein the mass flow rate of the exhaust gas passing through the low pressure EGR cooler is calculated using a low pressure EGR valve model.

3. The low pressure EGR cooler efficiency diagnosis method of claim 1, wherein the efficiency of the low pressure EGR cooler is calculated based on the mass flow rate of exhaust gas passing through the low pressure EGR cooler, a coolant temperature, and an exhaust gas temperature at an inlet of the low pressure EGR cooler.

4. The low pressure EGR cooler efficiency diagnosis method of claim 1, wherein the temperature downstream of the low pressure EGR cooler is calculated using a low pressure EGR cooler efficiency model.

5. The low pressure EGR cooler efficiency diagnosis method of claim 1, wherein if the difference between the model temperature and the detected temperature is larger than the predetermined threshold, a debounce is performed.

6. The low pressure EGR cooler efficiency diagnosis method of claim 5, wherein the low pressure EGR system is stopped if errors are continuously generated while the debounce is being performed.

7. The low pressure EGR cooler efficiency diagnosis method of claim 6, further comprising sending an alarm through a warning lamp when the low pressure EGR system is stopped.

8. A low pressure EGR system, which includes an intake line through which an intake air is supplied into an engine, an exhaust line through which an exhaust gas of the engine passes, a low pressure EGR line that is diverged from the exhaust line and connected to the intake line, a low pressure EGR valve that is disposed on the low pressure EGR line, and a low pressure EGR cooler that cools the exhaust gas flowing through the low pressure EGR valve, the system comprising:

pressure sensors disposed at a downstream side and an upstream side of the low pressure EGR valve;

a temperature sensor that is disposed at a downstream side of the low pressure EGR cooler to detect a temperature at the downstream side of the low pressure EGR cooler;

an ECU wherein the ECU sets a threshold of a difference between a model temperature and a detected temperature downstream of the low pressure EGR cooler, measures a pressure difference between the upstream side and the downstream side of the low pressure EGR valve by using the pressure sensors, calculates a mass flow rate of the exhaust gas passing through the low pressure EGR cooler based on the measured pressure difference calculates an efficiency of the low pressure EGR cooler based on the calculated mass flow rate, calculates the model temperature downstream of the low pressure EGR cooler based on the calculated efficiency; and compares the model temperature downstream of the low pressure EGR cooler with the detected temperature downstream of the low pressure EGR cooler, wherein the mass flow rate of the exhaust gas is calculated according to a first equation of $$\dot{m}_{LP\text{-}EGR} = \rho_{exh} Q_{exh} = C \cdot A_{Flap} \sqrt{2\rho_{exh}\Delta P} = f(\Delta P, \text{valve position})\sqrt{2\rho_{exh}\Delta P} \quad \text{Eq. (1)}$$

wherein, the $\dot{m}_{LP\text{-}EGR}$ is a mass flow rate of the exhaust gas flowing in the low pressure EGR line, wherein the $\rho_{exh}$ is a density of the exhaust gas, wherein the $Q_{exh}$ is a volume flow rate of the exhaust gas, wherein the C is a coefficient, wherein the $A_{Flap}$ is a cross-section of the low pressure EGR valve, wherein the $\Delta P$ is the pressure difference between the upstream and the downstream of the low pressure EGR valve, wherein the efficiency of the low pressure EGR cooler is calculated according to a second equation of $$\eta = f(\dot{m}_{LP\text{-}EGR}, T_{coolant} - T_{in}), \quad \text{Eq. (2)}$$

wherein the $T_{coolant}$ is a coolant temperature flowing in or flowing out of the low pressure EGR cooler, and wherein the $T_{in}$ is an exhaust gas temperature of an upstream side of the low pressure EGR cooler, and wherein the calculating of the model temperature downstream of the low pressure EGR cooler is performed by substituting the second equation into a third equation of $$T_{out} = T_{in} - \eta(T_{in} - T_{coolant}), \quad \text{Eq. (3)}$$

wherein the $T_{out}$ is the model temperature of the downstream side of the low pressure EGR cooler, and wherein the $\eta$ is the efficiency of the low pressure EGR cooler.

9. The low pressure EGR system of claim 8, wherein at least one of the pressure sensors are disposed at the downstream side of the low pressure EGR valve and/or at the downstream side of the low pressure EGR cooler.

10. The low pressure EGR system of claim 8, wherein an emergency filter is disposed at the upstream side of the low pressure EGR cooler.

11. The low pressure EGR system of claim 8, wherein a catalyst is disposed at an upstream side of the low pressure EGR line.

12. The low pressure EGR system of claim 11, wherein the catalyst includes a diesel filter catalyst or a diesel oxidation catalyst.

13. The low pressure EGR system of claim 8, wherein a warning lamp is lit to send an alarm of an emergency condition of the system for the low pressure EGR.

* * * * *